(12) United States Patent
Richey, II et al.

(10) Patent No.: US 6,615,937 B2
(45) Date of Patent: Sep. 9, 2003

(54) MOTORIZED WHEELCHAIRS

(75) Inventors: Joseph B. Richey, II, Chagrin Falls, OH (US); Theodore D. Wakefield, II, Vermilion, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 09/932,182

(22) Filed: Aug. 17, 2001

(65) Prior Publication Data

US 2002/0011361 A1 Jan. 31, 2002

Related U.S. Application Data

(60) Continuation-in-part of application No. 09/785,744, filed on Feb. 16, 2001, which is a division of application No. 09/365,276, filed on Jul. 30, 1999, now Pat. No. 6,202,773.

(51) Int. Cl.⁷ ................................................ B62D 11/04
(52) U.S. Cl. ...................... 180/6.5; 180/907; 180/65.1; 280/304.1; 701/72
(58) Field of Search .................. 180/6.2, 6.48, 180/6.5, 907, 65.1; 280/250.1, 304.1; 477/1; 701/41, 42, 72; 318/587

(56) References Cited

U.S. PATENT DOCUMENTS

| 4,415,049 A | 11/1983 | Wereb |
| 4,471,273 A | 9/1984 | Melocik et al. |
| 4,511,825 A | 4/1985 | Klimo |
| 4,549,624 A | 10/1985 | Doman |
| 4,634,941 A | 1/1987 | Klimo |
| 5,022,476 A | 6/1991 | Weege |
| 5,234,066 A | 8/1993 | Ahsing et al. |
| 5,253,724 A | 10/1993 | Prior |
| 6,202,773 B1 | 3/2001 | Richey et al. |

FOREIGN PATENT DOCUMENTS

| DE | 3724161 | 12/1988 |
| DE | 4231821 | 3/1994 |
| EP | 0324101 | 7/1989 |
| GB | 2218517 | 11/1989 |
| GB | 2342903 | 4/2000 |
| GB | 2352522 | 1/2001 |
| JP | 10314234 | 12/1998 |
| WO | 94 20325 | 9/1994 |

OTHER PUBLICATIONS

Cooper, R.A. "Intelligent Control of Power Wheelchairs", I.E.E.E. Engineering in Medicine & Biology Magazine, vol. 14, No. 4, Jul./Aug. 1995, pp. 423–430, New York, U.S.

*Primary Examiner*—Avraham Lerner
(74) *Attorney, Agent, or Firm*—Calfee, Halter & Griswold; Nenad Pejic; Chet Bonner

(57) ABSTRACT

A motorized wheelchair is advantageously provided with a rate-of-turn feedback sensor and with forward/reverse motion, lateral motion, and vertical motion acceleration feedback sensors that are integrated into a closed-loop wheelchair servo control system to differentially control the rotational speed of wheelchair opposed motor-driven wheels and thereby obtain improved wheelchair motion stability through reduction/elimination of likely wheelchair spin-out and wheelchair tipping during wheelchair operation.

31 Claims, 2 Drawing Sheets

MOTORIZED WHEELCHAIRS

This application is a continuation-in-part of application Ser. No. 09/785,744, filed Feb. 16, 2001, which is a divisional application of application Ser. No. 09/365,276, filed Jul. 30, 1999, now U.S. Pat. No. 6,202,773, the disclosure of each is hereby incorporated herein by reference.

FIELD OF INVENTION

The present invention relates generally to motorized wheelchairs, and particularly concerns a wheelchair stability control system that advantageously and significantly reduces wheelchair tendencies toward veering and/or tipping during wheelchair operation.

BACKGROUND OF THE INVENTION

Motorized wheelchairs with differential steering tend to be difficult to control. The wheelchair short wheelbase and narrow track necessary for maneuverability in close quarters makes it difficult to achieve wheelchair stability during operation at relatively high forward velocities. The stability problem is exacerbated in the typical front-wheel drive wheelchair by the use of trailing, freely-swiveling castors. In such wheelchairs the center of gravity is behind the wheelchair drive wheels and thus the momentum of the moving wheelchair adds to any turning force generated by the drive wheels. Once the front wheels lose traction, the trailing castors allow the wheelchair to spin out of control. In a rear-wheel drive wheelchair, where the center of gravity is ahead of the drive wheels the inertia of the wheelchair opposes turning forces generated by the drive wheels.

Also, in front-wheel drive wheelchairs the center of gravity with the occupant included is generally positioned at a level that is above the level of the drive wheel axis of rotation, and thus braking forces generated at the drive wheels during wheelchair forward motion, when combined with the momentum forces acting through the center of gravity, create wheelchair forward tipping moments which further contribute to wheelchair motion instability.

A typical maximum stable speed for rear-wheel drive wheelchairs is about 7+ miles per hour. The typical maximum speed for front-wheel drive wheelchairs is approximately 4 miles per hour if the drive wheel differential speed is monitored with motor current/voltage sensing. If the front drive wheels are monitored with tachometers and/or position sensors, speeds of approximately 5 miles per hour can be achieved. However, in either instance once the wheels start to slip, directional control is lost.

It is possible to further increase the maximum speed to about 6 or 7 miles per hour in a front-wheel drive wheelchair by steering the rear castors, but this approach sacrifices the maneuverability (turning radius) that predicted the selection of front-wheel drive to start. Such wheelchairs are not practical for indoor use.

An additional stability problem with both front-wheel drive and rear-wheel drive power wheelchairs is "veering" when traversing a sloping surface. In those instances there often is a tendency for the wheelchair to uncontrollably turn or "veer". Such can be an instability problem of major magnitude in wheelchairs that use switch-type operator controls.

Additional stability problems can occur with the failure of a rate-of-turn sensor.

SUMMARY OF INVENTION

The motorized wheelchair of the present invention includes a wheelchair chassis, a motorized right front-wheel connected to the chassis, a motorized left front-wheel connected to the chassis, and a trailing castor assembly also connected to the chassis. The invention wheelchair further includes an operator input device such as a conventional joystick control that generates, in response to operator manipulation, wheelchair forward/reverse linear velocity commands and wheelchair turn direction/turn rate commands. Also included in the invention wheelchair is a closed-loop servo control system controller subassembly that, in addition to receiving operator input turn and velocity commands, receives operating power from a battery source, and generates and utilizes control system feed-back inputs from included rate-of-turn, forward acceleration, lateral acceleration, and vertical acceleration sensors.

From an operating method standpoint, the wheelchair invention involves the steps of rotating two front wheel drive wheels at equal rates to cause wheelchair forward and/or reverse linear motion in accordance with corresponding input command signals, or differentially in response to wheelchair turn commands, of sensing the wheelchair turn direction and wheelchair turn rate with an angular rate-of-turn sensor, of comparing or summing the sensed wheelchair turn direction and wheelchair turn rate with the system input command turn direction and turn rate, and of differentially altering the motorized wheelchair wheel rotational speeds in response to the comparison step thereby obtaining improved wheelchair motion stability, especially with respect to reduction of wheelchair spin-out or veering tendencies and with respect to reduction of wheelchair tipping tendencies.

In addition, stability of the wheelchair can be increased by the inclusion of a detector for detecting the operation and/or the failure of the angular rate-of-turn sensor. Upon detection of the failure of the angular rate-of-turn sensor, the forward velocity of the wheelchair is limited to a maximum forward velocity that the wheelchair can obtain without the use of the rate-of-turn sensor. One advantage of limiting the wheelchair to a maximum forward velocity, rather than forcing the wheelchair to come to a complete stop is to allow the wheelchair occupant the limited mobility to continue moving without being completely stranded. Detecting the failure of the rate-of-turn sensor and the subsequent automatic control of the forward velocity has the advantage of preventing the wheelchair from going into an uncontrolled spin.

Failure of the rate-of-turn sensor may be detected by monitoring or sensing the signal of the rate-of-turn sensor. This can be accomplished by utilizing a second rate-of-turn sensor having an output which is equal in magnitude but opposite in polarity to the first rate-of-turn sensor for a given rate-of-turn. The outputs of each can be compared to one another, wherein the failure of a rate-of-turn sensor can be determined by a change in this comparison.

DETAILED DESCRIPTION

Figure 1:
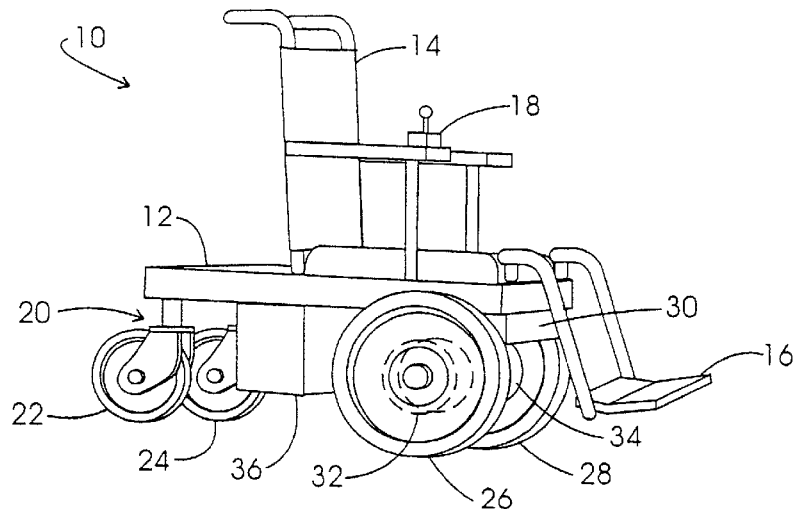
FIG. 1 is a perspective view of a preferred embodiment of the motorized wheelchair system of the present invention.

Referring to FIG. 1, a front-wheel drive motorized wheelchair 10 includes a chassis 12, an occupant seat 14, a footrest 16, an operator input device 18 often having the form of a conventional wheelchair joystick input control, a castor assembly 20 including two freely-swiveling castors 22 and 24, a right driven front-wheel 26, a left driven front-wheel 28, and a controller 30. Operator input control 18 typically outputs a turn direction value voltage signal and separately a linear velocity voltage signal; such output value voltage signals simultaneously indicate an operator-desired wheelchair angular turn rate command.

The center of gravity of occupied power wheelchair 10 is to the rear of front wheels 26, 28. When wheelchair 10 is in forward motion and starts to turn, its momentum acts through the center of gravity to try to push castor wheels 22, 24 out of track behind front wheels 26, 28. Only as long as front wheels 26, 28 maintain traction do castor wheels 22, 24 stay in track. When a wheel 26 or 28 loses traction, power wheelchair 10 spins out, controller 30 monitors wheelchair turn rate and turn direction and limits wheelchair turn rate to values in the desired direction and less than or equal to the desired turn rate.

Figure 2:
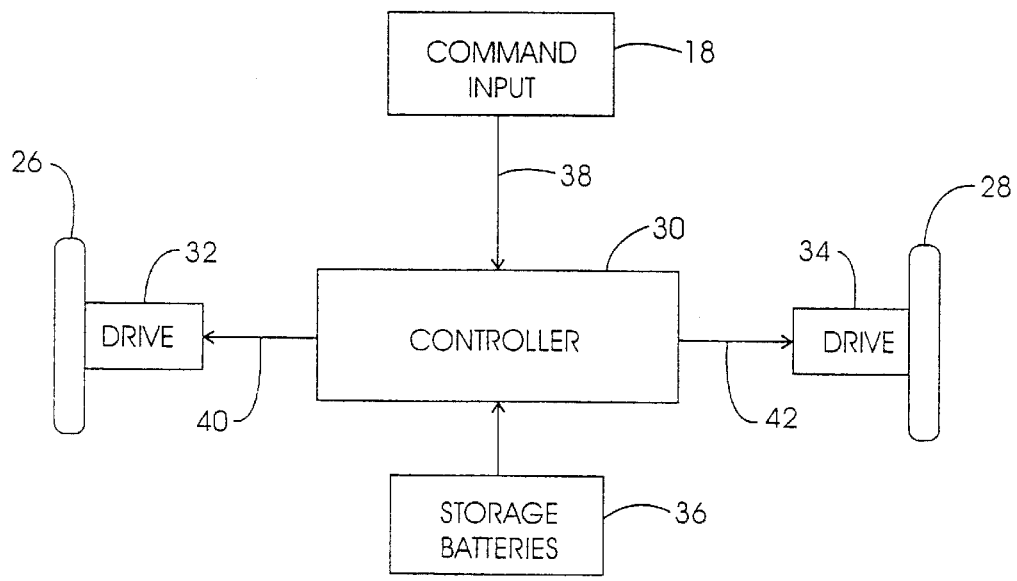
FIG. 2 is a schematic functional block diagram of the wheelchair system of FIG. 1.

Referring to FIG. 2, motorized wheelchair 10 is illustrated with a different type of reversible electrical motor drive for each driven wheel for the sake of completeness. (In practice, only a single type drive would be used on any given wheelchair.) Right driven front-wheel 26 is driven by a reversible direct current electrical motor 32 acting through conventional gears and controlled by controller 30. Left driven front-wheel 28 is driven directly by a reversible brushless and gearless motor 34 in response to controller 30. Power for controller 30 and for reversible drives 32 and 34 is supplied by conventional storage batteries 36. Drives 32 and 34 also provide negative drive, i.e., braking, for front-wheels 26 and 28.

Command input device 18 communicates with controller 30 through conventional electrical control cable 38. Element 18, which may take the form of a conventional joystick-type command input control, is provided as an input device to allow the operator/occupant of power wheelchair 10 to control its movement, including forward, reverse, and/or turning movements. Other types of input device could also be used, for example, a "sip and puff" device or an operator head movement sensor.

Controller subassembly 30 is essentially a digital signal-processor that is integrated into and functions as a closed-loop servo control system, that is mounted on and supported by wheelchair chassis 12, and that effects, in response to commands from operator input device 18, differential speed regulation of wheels 26, 28 via electrical cables 40, 42 for both wheelchair turn motion control and wheelchair linear motion control.

Figure 3:
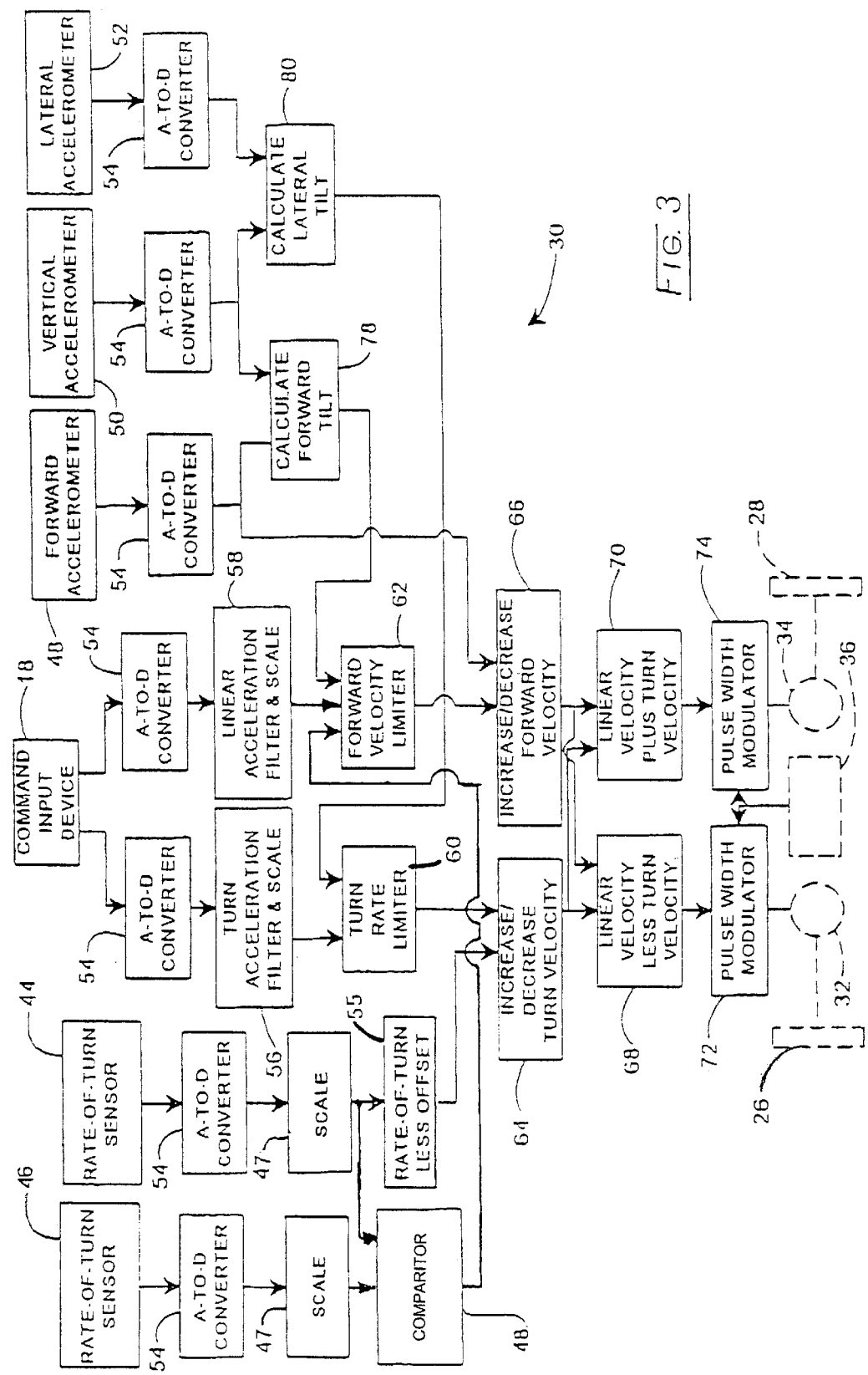
FIG. 3 is a schematic functional block diagram of the wheelchair system closed-loop controller subassembly illustrated in FIG. 2.

Referring to FIG. 3, one important aspect of the present invention is the utilization in controller subassembly 30 of angular rate-of-turn sensors 44, 46 which may take the form of a piezoelectric ceramic "gyroscope" similar to the Model CG-16D sensor manufactured and sold by Tokin America Corporation, or a conventional actually-rotating gyroscope, or be construed using properly orthogonally-oriented conventional linear accelerometer devices. In any event, it is preferred that angular rate-of-turn sensors 44, 46 are able to measure wheelchair chassis angular rates of turn of at least 280 degrees per second to correspond to generally-desired wheelchair turning rate capabilities. Such rate-of-turn sensor can be utilized by itself to control turning of the wheelchair.

The illustrated system input command device 18 and angular rate-of-turn sensors 44, 46 typically generate analog voltage output signals, and accordingly the output signal of each is processed through an analog to digital converter 54 for subsequent utilization within controller subassembly 30. The axis of sensors 44 and 46 are oriented opposite to one another. In other words, if the output of sensor 44 is a positive signal for a given turning rate, the output of sensor 46 is a negative signal of equal magnitude for the same turning rate of the wheelchair. Likewise, if the output of sensor 44 is a negative signal for another turning rate, the output of sensor 46 is a positive signal of equal magnitude for the same turning rate of the wheelchair.

The signals of rate-of-turn sensors 44, 46, subsequent to their analog to digital conversion in respective circuits 54, are scaled in respective circuits 47 to an equal magnitude by multiplying by a scale factor. It is preferred that the scale factor is determined by a calibration routine during which the sensors are rotated at a known rate and then stored in non-volatile memory which may be preset, such as at the factory. Other methods and means may be used to produce the scaling of the rate-of-turn signals, such as by utilizing an amplifier and potentiometer gain adjustment. The signal of the rate-of-turn sensor 44, subsequent to scaling in circuit 47, is filtered in rate-of-turn less offset circuit 55 by a 2.5 second average filter (could be less than 1 second to a few minutes) which is updated only while the wheelchair is not being driven, i.e. a neutral drive command from device 18. The averaged value is the "neutral offset" of rate-of-turn sensor 44. The neutral offset may vary with time or ambient temperature. Specifically, the Model CG-16D sensor neutral offset can vary as much as 180 angular degrees per second over the temperature range of 5 to 75 degrees Celsius. Averaging the sensor output while in neutral removes transient changes in the sensor output introduced by small movements of the wheelchair caused by, for instance, the operator shifting their weight on the seat of the wheelchair. While driving commands are being generated through device 18, the neutral offset is subtracted from the sensor 44 output signal.

It should be noted that circuit 55, as well as other system circuits having a computing function such as those circuits referenced by the numerals 56, 58, 78, and 80, are of the computer-controlled type. The operating parameters of such circuits are or may be set and varied by conventional computer software.

System turn command inputs are filtered and scaled in integrated circuit 56 and wheelchair linear (forward/reverse) velocity command inputs are filtered and scaled in integrated circuit 58. For example, the output of sensor 44 can be scaled to correspond one-to-one with that of joystick control 18, though other values are possible. Specifically, at high wheelchair forward velocities the desirable ratio is greater than one, while at slow wheelchair linear speeds the ratio is desirably less than one. In the case of a one-to-one ratio, the desired turn rate and actual turn rate are substantially the same. Using this method to stabilize the turning performance of a front-wheel drive wheelchair allows the wheelchair to operate at speeds of greater than 7 miles per hour. As an example, when making a right turn at an excessive speed so as to cause a spinout, controller 30 will send a signal to the outside or left drive wheel to slow down as by applying a dynamic or regenerative braking thereto and optionally by increasing the speed of the right front wheel. Thus, generally through such dynamic or regenerative braking action and/or to a lesser extent by increasing the rotational speed of the remaining drive wheel, power wheelchair stability can readily be maintained.

Further improvements in power wheelchair stability performance are made by including accelerator sensors 48, 50, and 52 as integral parts of the controlled assembly. The additional circuits for signal processing within controller subassembly 30 also include limiter circuits 60 and 62 which respectively limit wheelchair turn rate to below a limit value, and limit wheelchair linear deceleration to below a limit value. The limit value for the wheelchair turn rate and the limit value for the linear deceleration may vary for each type and/or wheelchair configuration and can be predetermined. These limit values may be stored in a non-volatile memory which may be preset, such as at the factory.

The actual wheelchair linear deceleration is determined in circuit 78 and compared to the limit value of the wheelchair linear deceleration value in circuit 62. In addition, forward velocity limiter 62 adjusts the forward velocity so that the limit value of the wheelchair linear deceleration is not exceeded.

Similarly, the actual wheelchair turn rate is determined in circuit 80 and compared to the limit value of the wheelchair turn rate value in circuit 60. In addition, turn rate limiter circuit 60 will adjust the turn velocity so that the limit value is not exceeded.

An equation that has been utilized to determine the actual wheelchair Forward Tilt in circuit 78 based on the output signals of acceleration feedback sensors 48 and 50 is:

$$\text{Forward Tilt} = \arcsin \frac{(\text{Forward Acceleration})}{\sqrt{(\text{ForwardAcceleration})^2 + (\text{VerticalAcceleration})^2}}$$

A similar equation for calculating the actual wheelchair Lateral Tilt in circuit 80 using the output signals of acceleration feedback sensors 50 and 52 is:

$$\text{Lateral Tilt} = \arcsin \frac{(\text{Lateral Acceleration})}{\sqrt{(\text{LateralAcceleration})^2 + (\text{VerticalAcceleration})^2}}$$

Increase/decrease turn rate circuit 64 and increases/decrease forward velocity circuit 66, which circuits are essentially summing circuits, act upon the outputs of circuits 60 and 62 on a comparison basis respectively with the outputs of rate-of-turn sensor 44 and with the hereinafter-identified combined outputs of forward and vertical accelerometer sensors 48, 50, and 52. However, as in the case of rate-of-turn sensors 44 and 46, such acceleration sensors need not be installed physically within the confines or enclosure of controller 30 but instead may be remotely installed in wheelchair 10 provided they have proper support and proper installation orthogonal orientation.

By properly securing and orthogonally orienting controller 30 on chassis 12 such sensors function to detect and measure or indicate motorized wheelchair actual accelerations in orthogonal forward/reverse, vertical, and lateral directions, respectively. Front-wheel drive wheelchairs may tip forward if decelerated too quickly. The output from forward/reverse accelerometer 48 can be advantageously utilized by controller 30 to anticipate and limit deceleration to a permissible rate that will ensure that wheelchair 10 will not tip forward when slowing, as for example, on a horizontal surface.

The combination of forward/reverse accelerometer 48 and vertical accelerometer 50 can be used by controller 30 to limit deceleration when going down a hill, slope, ramp, or the like, and such is accomplished using a trigonometric algorithm calculation of actual wheelchair forward inclination or tilt in integrated circuit 78 based on wheelchair forward inclination or tilt in integrated circuit 78 based on wheelchair forward and vertical actual acceleration values. In other words, controller 30 can place constraints on velocity and deceleration to ensure reliable and safe wheelchair operation through improved motion stability. In particular, top velocity can be limited as a function of a substantially flat surface, or of a slope, or a hill, etc. to establish a desired stopping distance subject to permissible deceleration rate as to prevent forward tipping of the wheelchair.

Further improvements in power wheelchair stability performance include the ability to detect the failure of rate-of-turn sensor 44. The failure of rate-of-turn sensor 44 may result in the wheelchair going into an uncontrolled spin. Upon the detection of the failure of rate-of-turn sensor 44, the forward velocity of the wheelchair is limited to a velocity that can be safely driven without the input of the rate-of-turn sensor 44. However, consideration also must be given so that this maximum forward velocity does not result in the wheelchair decelerating too quickly, thereby exceeding the maximum forward tilt limit value of circuit 78. In other words, the forward velocity of the wheelchair may be required to ramp down to the maximum forward velocity limit in order to have a smooth deceleration and thereby avoid tipping. One advantage to limiting the maximum forward velocity.; rather than forcing the wheelchair to come to a complete stop is that it allows the wheelchair occupant limited mobility, such as ability to limp home rather than becoming stranded at the point of failure. The maximum forward velocity may be, for example, limited to about 3 miles per hour.

The detection of the failure of rate-of-turn sensor 44 may be implemented by comparing the scaled outputs of rate-of-turn sensors 44 and 46 in circuitry 48. Circuitry 48 could be a summing circuit or it could be a comparator. Since the outputs of rate-of-turn sensors 44 and 46, under normal operation, are equal in magnitude but opposite in polarity, the resultant of a summation (or other comparison), is zero. However, should sensor 44 fail the resultant of the comparison of circuitry 48 will not be zero. Therefore, a signal generated by circuitry 48 indicates that there has been a failure of sensor 44. The output of circuitry 48 is coupled to the forward velocity limiter 62.

Upon sensing the output of comparison circuitry 48 the forward velocity of the wheelchair is limited to the maximum forward velocity that the wheelchair can obtain without the use of a rate-of-turn sensor 44 by forward velocity limiter 62. The maximum forward velocity (MFVF) due to failure of sensor 44 could be limited to, for example, about 3 miles per hour. Therefore circuit 62 upon receiving a signal from circuitry 48 compares the input command signal from circuit 58 with the MFVF and if the command input signal is in excess the MFVF, circuit 62 will limit that signal to the MFVF value. The MFVF value must also be compared to the forward tilt value generated by circuit 78. If the MFVF is in excess of the value generated in circuit 78, then circuit 62 will limit the forward velocity to the value of the forward tilt generated by circuit 78 so as not to cause the wheelchair to tip during deceleration. This will allow the wheelchair to have a controlled deceleration. Once the forward tilt generated by circuit 78 is in excess of the MFVF, then the wheelchair will be limited to the MFVF value.

While it is preferred that the result of the comparison of the signals of the rate-of-turn sensors 44 and 46 in circuitry 48 is zero, in practice, it may not be due to sensor noise, errors in scale factor generation or application, or other factors. An error band around zero may be used to remove or filter these effects and prevent false error triggers. When the sum of the signals is within the error band, no velocity limiting takes place. If the sum of the signals is outside of the error band for at set period of time (250 milliseconds for example), a failure in the rate-of-turn sensor 44 is detected.

The inclusion of lateral accelerometer 52 adds the ability to sense lateral movement of wheelchair 10. Thus, the forward accelerometer 48 in combination with lateral accelerometer 52 can be utilized by controller 30 to limit deceleration to a permissible rate as when going around a turn to prevent the wheelchair from spinning-out and/or tipping. Such involves a trigonometric algorithmic calculation of actual wheelchair lateral inclination or tilt based on both lateral and vertical actual acceleration values in digital signal-processor circuit 80. This can be done by placing constraints or limits on velocity, deceleration, turning rate, and the like to ensure reliable operation.

The addition of a vertical accelerometer adds the further ability to sense vertical movement as when moving down a slope, ramp, hill, or the like, thereby allowing controller 30 to place necessary constraints on motion parameters that assure safe and reliable operation against spin-out and/or tipping as on a hill, etc.

Lastly, controller 30 couples and cross-couples combined outputs of controller integrated circuits 64 and 66 at summation circuits 68 and 70, and routes the outputs of integrated circuits 68 and 70 to their respective conventional pulse width modulator circuit 72, 74 for conditioning to a state suitable for driving left and right drive motors 32 and 34.

It should be noted that the present invention automatically corrects for wheelchair veering when the power wheelchair is traversing a sloped surface. For example, joystick control 18 would be calling for a desired turn rate of zero, but the sensor 44 would detect veering and the controller would automatically adjust the differential speed control to compensate for and zero out the veer.

One characteristic of piezoelectric ceramic rate-of-turn sensors is that they have a substantial offset voltage that varies significantly with temperature. In order to accommodate this characteristic, controller 30 attempts to correct for the offset whenever wheelchair 10 is at rest. When wheelchair 10 is at rest, controller 30 averages the output of sensor 44 using, for example, a 2.5 second time constant to determine a correction value for the offset voltage. Then when the wheelchair is in motion, the values provided by sensor 44 are corrected by controller 30 using the correction value. Likewise, the controller 30 corrects for the offset voltage of sensor 46.

It should be noted that while two freely-swiveling trailing castors are normally utilized in a power wheelchair, other numbers such as one or three could also be used. Also, though the preferred embodiment uses separate drives for each driven wheel, it is possible to use a single drive that appropriately divides the drive power between the drive wheels with, for example, adjustable clutches.

It should be noted that with respect to detecting and measuring slopes, inclinations, and tilts, other sensors besides accelerometers could be used, for example, suitable damped pendulum-like sensors.

While the invention has been described with respect to a front-wheel drive power wheelchair, it also is generally applicable to mid-wheel drive power wheelchairs and to rear-wheel drive wheelchairs.

While in accordance with the patent statutes the best mode and preferred embodiment has been set forth, the scope of the invention is not limited thereto, but rather by the scope of the attached claims.

What is claimed is:

1. In a method of controlling motion of a motorized wheelchair assembly having separately-controlled, motor-driven right and left wheels that provide wheelchair assembly rolling support, the steps of:

providing turn direction command inputs and turn rate command inputs to the motorized wheelchair assembly to cause correlated wheelchair motion;

sensing the actual turn direction and actual angular rate-of-turn of said motorized wheelchair assembly;

comparing said sensed wheelchair assembly actual turn direction and angular rate-of-turn signals with wheelchair assembly provided turn direction and turn rate command inputs and developing their respective differences as control signals;

utilizing said developed control signals to regulate differential rotation of said motorized wheelchair assembly motor-driven right and left wheels to thereby limit wheelchair actual rate-of-turn magnitude to a predetermined magnitude not exceeding the magnitude of said wheelchair assembly turn rate command input; and upon the failure to sense the actual turn direction and actual angular rate-of-turn of said motorized wheelchair assembly generating a maximum forward velocity to thereby limit wheelchair actual forward velocity.

2. A method of controlling a motorized wheelchair assembly, having a right motor-driven wheel and a left motor-driven wheel, comprising the steps of:

a) generating a first driving signal for driving the right motor-driven wheel and a second driving signal for driving the left motor-driven wheel;

b) generating a wheelchair turn direction command signal and a wheelchair linear velocity command signal;

c) sensing actual turn directions of the wheelchair and generating an actual turn direction signal;

d) sensing actual turn rate and generating an actual turn rate signal;

e) comparing said wheelchair turn direction and linear velocity command signals to said actual turn direction and actual turn rate signals;

f) as a result of said comparison step modifying at least one of the first or second driving signals; and g) upon the detection of a failure to sense the actual turn rate, limiting the linear velocity command signal to a maximum value.

3. A method of controlling a motorized wheelchair assembly, having a right driven wheel and a left motor-driven wheel comprising the steps of:

a) generating a turn command input signal and a linear velocity command signal;

b) sensing actual angular rates of turn of the wheelchair and generating a corresponding first actual rate-of-turn signal;

c) sensing the first actual rate-of-turn signal;

d) comparing said turn command input signal and the first actual rate-of-turn signal;

e) in response to said comparison step, regulating differential rotation of the motor-driven right and left wheels; and f) upon the failure to sense the first actual rate-of-turn signal, limiting the linear velocity command signal to a maximum value.

4. The method of claim 3, wherein said step of sensing the actual rate-of-turn signal includes the steps of:

sensing actual angular rate-of-turn of the wheelchair and generating a corresponding second actual rate-of-turn signal; and comparing the first and second actual rate-of-turn signals.

5. The method of claim 4 further comprising the step of: compensating the first and second actual rate-of-turn signals for changes in temperature.

6. The method of claim 4 further comprising the steps of: averaging an output of each rate-of-turn sensor with the wheelchair at rest to determine a correction values and utilizing the correction values to compensate the first and second actual rate-of-turn signals.

7. The method of claim 3 further including the steps of:
g) determining a maximum linear deceleration of the wheelchair and a corresponding linear velocity;
h) limiting the forward velocity of the wheelchair to the linear velocity of step (g) if the maximum value of step (f) is less than the linear velocity of step (g).

8. The method of claim 3 further including the step of: controlling the deceleration of the wheelchair so as not to exceed a tilt limit value.

9. The method of claim 3 further comprising the steps of:
a) sensing vertical acceleration of the wheelchair and generating a vertical acceleration signal;
b) sensing forward acceleration of the wheelchair and generating a forward acceleration signal;
c) in response to said forward and vertical acceleration signals, determining a forward tilt limit; and
d) adjusting the maximum value of the linear velocity command signal during deceleration.

10. A method of controlling a motorized wheelchair assembly, having a right motor-driven wheel and a left motor-driven wheel, comprising the steps of:
a) generating a first driving signal for driving the right motor-driven wheel and a second driving signal for driving the left motor-driven wheel;
b) generating a wheelchair turn direction command signal and a wheelchair linear velocity command signal;
c) sensing actual turn directions of the wheelchair and generating an actual turn direction signal;
d) sensing actual turn rate and generating an actual turn rate signal;
e) comparing said wheelchair turn direction and linear velocity command signals to said actual turn direction and actual turn rate signals; and
f) as a result of said comparison step modifying at least one of the first or second driving signals.

11. A method of controlling a motorized wheelchair assembly, having a right driven wheel and a left motor-driven wheel comprising the steps of:
a) generating a turn command Input signal and a linear velocity command signal;
b) sensing actual angular rates of turn of the wheelchair and generating a corresponding actual rate of turn signal;
c) comparing said turn command input signal and the actual rate of turn signal; and
d) in response to said comparison step, regulating differential rotation of the motor-driven right and left wheels.

12. The method of claim 11 further comprising the step of: compensating the actual rate of turn signal for changes in temperature.

13. The method of claim 11 further comprising the steps of:

averaging an output of a rate of turn sensor with the wheelchair at rest to determine a correction value and utilizing the correction value to compensate the actual rate of turn signal.

14. The method of claim 11 further comprising the steps of:
regulating the turn command input so as not to exceed a maximum turn rate.

15. The method of claim 11 further comprising the steps of:
sensing vertical and lateral acceleration of the wheelchair; and in response to said sensed vertical and lateral acceleration, generating said actual turn rate.

16. The method of claim 11 further comprising the steps of:
a) determining actual wheelchair turn rate;
b) comparing the actual wheelchair turn rate and a maximum wheelchair turn rate; and as a result of such comparison, adjusting the turn velocity of the wheelchair.

17. The method of claim 16 wherein the lateral tilt is determined by the following:
Lateral Tilt=ARC SINE $$\frac{LA}{\sqrt{LA^2 + VA^2}};$$

wherein
LA=Lateral Acceleration
VA=Vertical Acceleration.

18. The method of claim 11 further comprising the steps of:
limiting the linear velocity command signal so that the wheelchair does not exceed a maximum linear deceleration.

19. The method of claim 18 further comprising the steps of:
a) sensing vertical acceleration of the wheelchair and generating a vertical acceleration signal;
b) sensing forward acceleration of the wheelchair and generating a forward acceleration signal; and
c) in response to said forward and vertical acceleration signals, determining an actual linear deceleration of the wheelchair.

20. The method of claim 18 further comprising the steps of:
a) measuring forward and vertical acceleration of the wheelchair; and
b) determining the actual forward tilt by the following:
Forward Tilt=ARC SINE $$\frac{FA}{\sqrt{FA^2 + VA^2}};$$

wherein
FA=Forward Acceleration
VA=Vertical Acceleration.

21. The method of claim 11 further comprising the steps of:
a) determining actual wheelchair turn rate;
b) comparing the actual wheelchair turn rate to a reference wheelchair turn rate; and c) as a result of said comparison adjusting the forward velocity of the wheelchair.

22. The method of claim 21 wherein the forward velocity of the wheelchair is adjusted so that the wheelchair does not exceed a maximum linear deceleration.

23. The method of claim 18 further comprising the steps of:
sensing forward acceleration of the wheelchair and generating a forward acceleration signal;
comparing the linear velocity command signal to said forward acceleration signal; and
c) as a result of said comparison adjusting the velocity of the right and left motor-driven wheels.

24. A method of controlling a motorized wheelchair, having first and second driven wheels, comprising the steps of:
a) generating a first driving signal for driving the first driven wheel;
b) generating a second driving signal for driving the second driven wheel;
c) generating turn and linear acceleration input signals;
d) sensing forward, vertical, and lateral acceleration of the wheelchair and generating corresponding forward, vertical and lateral acceleration signals;
e) sensing an angular rate of turn of the wheelchair and generating an actual rate of turn signal;
f) comparing the linear acceleration input signal to said forward acceleration signal, and as a result of such comparison adjusting the first and second driving signals;
g) comparing the turn acceleration signal to the actual rate of turn signal, and generating a turn compensation signal as a result of such comparison; and
h) utilizing said turn compensation signal to decrease the first driving signal while increasing the second driving signal.

25. The method of claim 24 further comprising the steps of:
generating a maximum linear velocity signal as a function of the forward and vertical acceleration signals, and limiting the linear acceleration input signal so as not to exceed the maximum linear velocity signal; and
generating a maximum rate of turn signal as a function of the vertical and lateral acceleration signals and limiting the turn rate input signal so as not to exceed the maximum rate of turn signal.

26. The method of claim 25 further comprising the step of:
compensating the actual rate of turn signal for changes in temperature.

27. The method of claim 26 wherein:
a) the actual lateral tilt is determined by the following:
Actual Lateral Tilt=ARC SINE $$\frac{LA}{\sqrt{LA^2 + VA^2}};$$

and b) the actual forward tilt is determined by the following:
Actual Forward Tilt=ARC SINE $$\frac{FA}{\sqrt{FA^2 + VA^2}};$$

wherein
LA=Lateral Acceleration
FA=Forward Acceleration
VA=Vertical Acceleration.

28. In a method of controlling motion of a motorized wheelchair assembly having separately-controlled, motor-driven right and left wheels that provide wheelchair assembly rolling support, the steps of:
providing turn direction command inputs and turn rate command inputs to the motorized wheelchair assembly to cause correlated wheelchair motion;
sensing the actual turn direction and actual angular rate-of-turn of said motorized wheelchair assembly;
comparing said sensed wheelchair assembly actual turn direction and angular rate of turn signals with wheelchair assembly provided turn direction and turn rate command inputs and developing their respective differences as control signals; and
utilizing said developed control signals to regulate differential rotation of said motorized wheelchair assembly motor-driven right and left wheels to thereby limit wheelchair actual rate-of-turn magnitude to a predetermined magnitude not exceeding the magnitude of said wheelchair assembly turn rate command input.

29. The method invention defined in claim 28, wherein said sensing step is accomplished gyroscopically.

30. The method invention defined by claim 28, wherein said sensing step involves sensing said actual turn direction and said actual rate-of-turn of said motorized wheelchair assembly while said wheelchair assembly is at rest and utilizing the so-sensed turn direction and rate-of-turn as correction values during subsequent sensing of said actual turn direction and actual rate-of-turn of said motorized wheelchair assembly.

31. The method invention defined by claim 28, and further comprising:
sensing motorized wheelchair assembly forward deceleration rates;
comparing said forward deceleration rates to a permissible deceleration rate based on wheelchair angle of actual wheelchair forward tilt, and developing their respective differences as control signals; and
utilizing said developed control signals to regulate differential rotation of said motorized wheelchair assembly motor-driven right and left wheels to thereby limit wheelchair actual rate-of-turn magnitude to a predetermined magnitude not exceeding the magnitude of said wheelchair assembly permissible deceleration rate.

* * * * *